United States Patent
Okubo (10) Patent No.: US 11,010,625 B2
(45) Date of Patent: May 18, 2021

(54) VEHICLE EXTERIOR ENVIRONMENT RECOGNITION APPARATUS AND METHOD OF RECOGNIZING EXTERIOR ENVIRONMENT OUTSIDE VEHICLE

(71) Applicant: SUBARU CORPORATION, Tokyo (JP)

(72) Inventor: Toshimi Okubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 198 days.

(21) Appl. No.: 16/460,258

(22) Filed: Jul. 2, 2019

(65) Prior Publication Data

US 2020/0074195 A1    Mar. 5, 2020

(30) Foreign Application Priority Data

Sep. 3, 2018    (JP) .............................. JP2018-164626

(51) Int. Cl.
*G06K 9/00*    (2006.01)

(52) U.S. Cl.
CPC ..... *G06K 9/00825* (2013.01); *G06K 9/00201* (2013.01)

(58) Field of Classification Search
None
See application file for complete search history.

(56) References Cited

U.S. PATENT DOCUMENTS

| | | | |
|---|---|---|---|
| 8,035,575 B2* | 10/2011 | Okabe | B60R 1/00 345/1.2 |
| 8,923,560 B2* | 12/2014 | Saito | G06K 9/00805 382/103 |
| 8,941,737 B2* | 1/2015 | Ozaki | B60R 1/00 348/148 |

(Continued)

FOREIGN PATENT DOCUMENTS

| | | |
|---|---|---|
| JP | 10-283461 A | 10/1998 |
| JP | 3349060 B2 | 11/2002 |
| JP | 2011-048420 A | 3/2011 |

OTHER PUBLICATIONS

Japanese Notice of Reasons for Refusal issued in corresponding Japanese Patent Application No. 2018-164626, dated Mar. 31, 2020, with English translation.

*Primary Examiner* — Anand P Bhatnagar
(74) *Attorney, Agent, or Firm* — McDermott Will & Emery LLP (57) ABSTRACT

A vehicle exterior environment recognition apparatus includes a position deriving unit, a grouping unit, and a pairing unit. The position deriving unit derives three-dimensional positions of respective blocks from an image received from an imaging unit. The grouping unit groups the respective blocks and identifies potential three-dimensional objects from the grouped blocks. The pairing unit projects the potential three-dimensional objects on a horizontal plane, classifies the potential three-dimensional objects into a rear face and a side face on a basis of angles of the potential three-dimensional objects on the horizontal plane with (Continued)

respect to a depth direction, determines whether a relation between the side face and the rear face satisfies a predetermined condition, and pairs the side face with the rear face into a single three-dimensional object when the determination is made that the relation between the side face and the rear face satisfies the predetermined condition.

18 Claims, 7 Drawing Sheets

(56) References Cited

U.S. PATENT DOCUMENTS

| | | | | |
|---|---|---|---|---|
| 8,941,738 B2* | 1/2015 | Saito | ............. | G06K 9/00791 348/148 |
| 9,709,986 B2* | 7/2017 | Gdalyahu | ............. | G01C 21/34 |
| 9,946,260 B2* | 4/2018 | Shashua | ............. | G06F 16/29 |
| 10,031,214 B2* | 7/2018 | Rosenzweig | ............. | G01S 17/04 |
| 10,037,471 B2* | 7/2018 | Satzoda | ............. | G06K 9/6223 |
| 10,127,463 B2* | 11/2018 | Fursich | ............. | H04N 13/239 |
| 10,215,859 B2* | 2/2019 | Steinberg | ............. | B60Q 1/0023 |
| 10,573,068 B2* | 2/2020 | Liu | ............. | G06T 17/05 |
| 2008/0239527 A1* | 10/2008 | Okabe | ............. | B60Q 9/008 359/843 |
| 2012/0242799 A1* | 9/2012 | Saito | ............. | G06K 9/00791 348/46 |
| 2013/0223689 A1* | 8/2013 | Saito | ............. | G06K 9/00791 382/104 |
| 2015/0224926 A1* | 8/2015 | Mochizuki | ............. | G06K 9/00798 701/36 |
| 2016/0148062 A1* | 5/2016 | Fursich | ............. | G06K 9/00805 348/36 |
| 2016/0182823 A1* | 6/2016 | Murasumi | ............. | B60R 11/04 348/38 |
| 2019/0066382 A1* | 2/2019 | Kubo | ............. | G01C 21/3647 |
| 2019/0088011 A1* | 3/2019 | Liu | ............. | G06T 17/05 |

* cited by examiner

VEHICLE EXTERIOR ENVIRONMENT RECOGNITION APPARATUS AND METHOD OF RECOGNIZING EXTERIOR ENVIRONMENT OUTSIDE VEHICLE

CROSS-REFERENCE TO RELATED APPLICATIONS

The present application claims priority from Japanese Patent Application No. 2018-164626 filed on Sep. 3, 2018, the entire contents of which are hereby incorporated by reference.

BACKGROUND

The technology relates to a vehicle exterior environment recognition apparatus that identifies a three-dimensional object present in a direction in which an own vehicle is traveling and a method of recognizing an exterior environment outside the own vehicle.

A technique has been known which detects a three-dimensional object, such as a preceding vehicle located ahead of an own vehicle, to perform control that avoids a contact with the preceding vehicle (i.e., contact avoidance control) or to perform control that keeps an intervehicle distance between the preceding vehicle and the own vehicle for safety driving (i.e., cruise control). Reference is made to Japanese Patent No. 3349060, for example.

SUMMARY

An aspect of the technology provides a vehicle exterior environment recognition apparatus includes a position deriving unit, a grouping unit, and a pairing unit. The position deriving unit is configured to derive three-dimensional positions of respective blocks from an image received from an imaging unit. The grouping unit is configured to group the respective blocks and identify potential three-dimensional objects from the grouped blocks. The pairing unit is configured to: project the potential three-dimensional objects on a horizontal plane, classify the potential three-dimensional objects into a rear face and a side face on a basis of angles of the potential three-dimensional objects on the horizontal plane with respect to a depth direction, and make a determination as to whether a relation between the side face and the rear face satisfies a predetermined condition; and pair the side face with the rear face into a single three-dimensional object when the determination is made that the relation between the side face and the rear face satisfies the predetermined condition.

An aspect of the technology provides a method of recognizing an exterior environment outside a vehicle. The method includes: determining three-dimensional positions of respective blocks of an image received from an imaging unit; grouping the respective blocks and identifying potential three-dimensional objects from the grouped blocks; projecting the potential three-dimensional objects on a horizontal plane, classifying the potential three-dimensional objects into a rear face and a side face on a basis of angles of the potential three-dimensional objects on the horizontal plane with respect to a depth direction, and determining whether a relation between the side face and the rear face satisfies a predetermined condition; and pairing the side face with the rear face into a single three-dimensional object when determining that the relation between the rear face and the side face satisfies the predetermined condition.

An aspect of the technology provides a vehicle exterior environment recognition apparatus. The vehicle exterior environment recognition apparatus includes circuitry configured to: determining three-dimensional positions of respective blocks of an image received from an imaging unit; group the respective blocks and identify potential three-dimensional objects from the grouped blocks; project the potential three-dimensional objects on a horizontal plane, classify the potential three-dimensional objects into a rear face and a side face on a basis of angles of the potential three-dimensional objects on the horizontal plane with respect to a depth direction, and make a determination as to whether a relation between the side face and the rear face satisfies a predetermined condition; and pair the side face with the rear face into a single three-dimensional object when the determination is made that the relation between the side face and the rear face satisfies the predetermined condition.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

In the following, some embodiments of the technology are described in detail with reference to the accompanying drawings. Note that sizes, materials, specific values, and any other factors illustrated in respective embodiments are illustrative for easier understanding of the technology, and are not intended to limit the scope of the technology unless otherwise specifically stated. Further, elements in the following example embodiments which are not recited in a most-generic independent claim of the technology are optional and may be provided on an as-needed basis. Throughout the present specification and the drawings, elements having substantially the same function and configuration are denoted with the same reference numerals to avoid any redundant description. Further, elements that are not directly related to the technology are unillustrated in the drawings. The drawings are schematic and are not intended to be drawn to scale.

It is necessary for contact avoidance control and cruise control to acquire an outside environment in front of an own vehicle, properly identify a three-dimensional object present in a direction in which the own vehicle is traveling, and determine whether the three-dimensional object is a specific object, such as a preceding vehicle. One possible measure to property identify a three-dimensional object involves grouping blocks adjacent to each other in a three-dimensional position into a rear face and a side face, and pairing the rear face with the side face into a single three-dimensional object. Such grouping of the blocks may be performed on the basis of a distance image generated by a stereo image process, for example.

However, a noise due to an error in measuring a relative distance or mismatching in the distance image can cause the blocks belonging to the rear face and the side face to vibrate. Such a vibration can hinder appropriate pairing between the rear face and the side face, resulting in a difficulty in stably identifying the rear face and the side face as a single three-dimensional object.

It is desirable to provide a vehicle exterior environment recognition apparatus and a method of recognizing an exterior environment outside a vehicle that appropriately pair a rear face with a side face and thus improve accuracy in identifying a three-dimensional object.

[Environment Recognition System 100]

Figure 1:
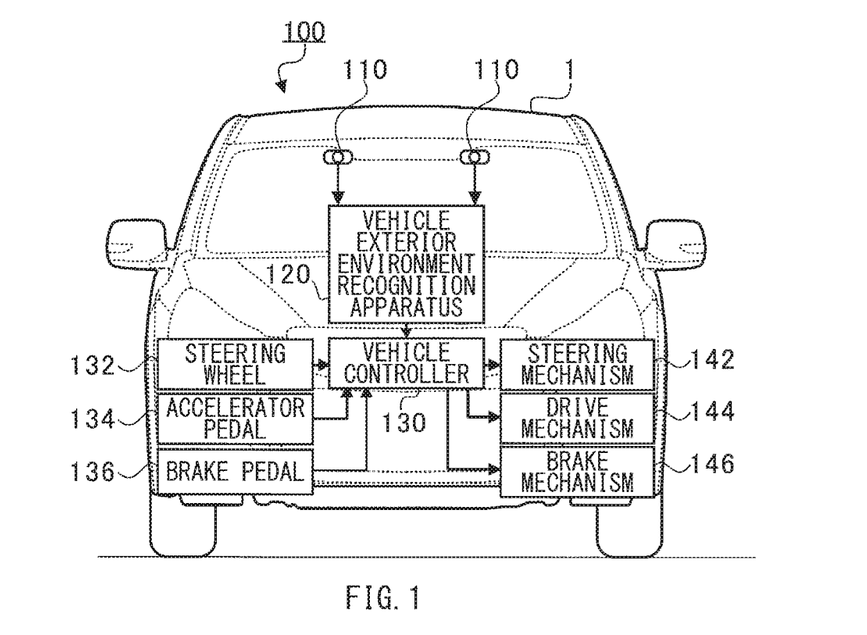
FIG. 1 is a block diagram illustrating an example relation of connection in a vehicle exterior environment recognition system according to one example embodiment of the technology.

FIG. 1 is a block diagram illustrating an example relation of connection in a vehicle exterior environment recognition system 100 according to an example embodiment of the technology. The vehicle exterior environment recognition system 100 may be mounted on an own vehicle 1, and may include one or more imaging units 110, a vehicle exterior environment recognition apparatus 120, and a vehicle controller (e.g., an engine control unit (ECU)) 130. The number of the imaging units 110 may be, for example but not limited to, two, in the example embodiment.

The two imaging units 110 may include an imaging device such as, but not limited to, a charge-coupled device (CCD) and a complementary metal-oxide semiconductor (CMOS). The imaging units 110 may each capture an image of an outside environment in front of the own vehicle 1, and may each generate a luminance image (e.g., color image or monochrome image) including at least luminance information. The two imaging units 110 may be disposed separated away from each other in a substantially horizontal direction. The two imaging units 110 may be disposed so that their respective optical axes are to be substantially parallel to each other along a traveling direction of the own vehicle 1. The imaging unit 110 may continuously generate a luminance image for each frame of, for example but not limited to, 1/60 second (at a frame rate of 60 fps). The luminance image may be obtained as a result of the imaging performed on a detection region ahead of the own vehicle. Non-limiting example of a three-dimensional object to be recognized with the imaging units 110 may include a three-dimensional object independently present, as well as an object identifiable as a part of the three-dimensional object. Non-limiting examples of the independently-present three-dimensional object may include a bicycle, a pedestrian, a vehicle, a traffic light, a road sign, a guardrail, and a building. Non-limiting examples of the object identifiable as a part of the three-dimensional object may include a rear face and a side face of a vehicle and a wheel of a bicycle. Note that the term "rear face" of a vehicle used herein does not necessarily refer to a back face of the vehicle, and may refer to any face of a vehicle opposed to the own vehicle 1.

The vehicle exterior environment recognition apparatus 120 may receive the respective luminance images from the two imaging units 110, and perform so-called pattern matching between the luminance images to generate a distance image. The vehicle exterior environment recognition apparatus 120 may derive, from the distance image, information on three-dimensional positions in a real space (hereinafter referred to as three-dimensional position information) through a so-called stereo method. The three-dimensional position information may include a relative distance to the own vehicle 1. The luminance image, the distance image, the pattern matching, and the stereo method are described in detail below.

The vehicle exterior environment recognition apparatus 120 may first identify a road face on the basis of the derived position information. The vehicle exterior environment recognition apparatus 120 may group blocks that are equal to each other in color values and close to each other in the three-dimensional position information into a rear face and a side face of a potential three-dimensional object. Thereafter, the vehicle exterior environment recognition apparatus 120 may perform pairing between the rear face and the side face to identify a three-dimensional object, and may identify a specific object (e.g., a preceding vehicle) to which the three-dimensional object corresponds. After identifying the specific object, the vehicle exterior environment recognition apparatus 120 may perform the contact avoidance control that causes the own vehicle 1 to avoid a contact with the specific object or perform the cruise control that keeps an intervehicle distance from the preceding vehicle for safety.

The vehicle controller 130 may control the own vehicle 1 by receiving a driver's operation input through a steering wheel 132, an accelerator pedal 134, and a brake pedal 136, and transmitting information on the input to a steering mechanism 142, a drive mechanism 144, and a brake mechanism 146. The vehicle controller 130 may also control the steering mechanism 142, the drive mechanism 144, and the brake mechanism 146, in accordance with instructions from the vehicle exterior environment recognition apparatus 120.

[Vehicle Exterior Environment Recognition Apparatus 120]

Figure 2:
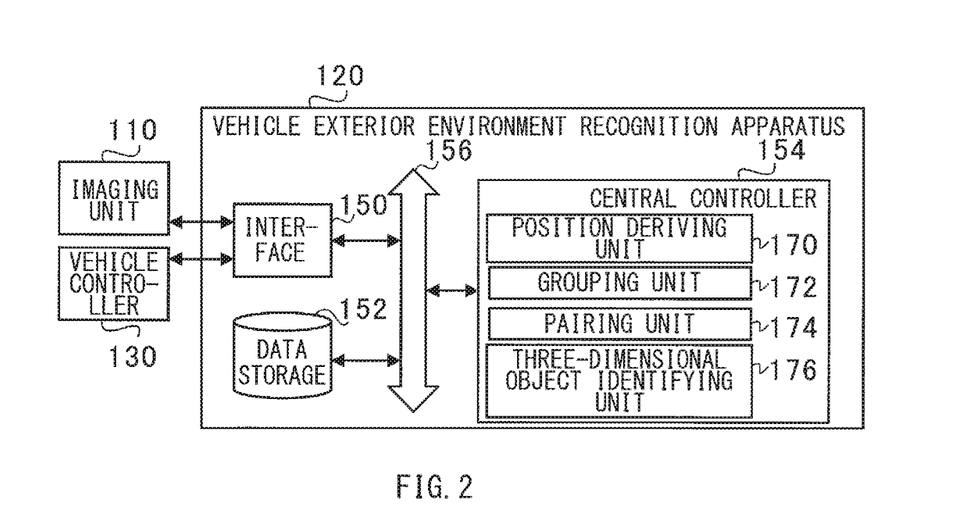
FIG. 2 is a block diagram schematically illustrating an example configuration of a vehicle exterior environment recognition apparatus according to one example embodiment of the technology.

FIG. 2 is a block diagram schematically illustrating an example configuration of the vehicle exterior environment recognition apparatus 120. As illustrated in FIG. 2, the vehicle exterior environment recognition apparatus 120 may include an interface 150, a data storage 152, and a central controller 154.

The interface 150 may exchange information bidirectionally between devices including, without limitation, the imaging unit 110 and the vehicle controller 130. The data storage 152 may include a random access memory (RAM), a flash memory, a hard disk drive (HDD), or any other suitable storage device. The data storage 152 may store various pieces of information necessary for processes to be carried out by components described below.

The central controller 154 may include a semiconductor integrated circuit that includes devices such as, but not limited to, a central processing unit (CPU), a read only memory (ROM) in which programs and other data items are stored, and a random access memory (RAM) serving as a work area. The central controller 154 may control devices including, without limitation, the interface 150 and the data storage 152 through a system bus 156. In this example embodiment, the central controller 154 may also include a position deriving unit 170, a grouping unit 172, a pairing unit 174, and a three-dimensional object identifying unit 176. In the following, a method of recognizing an exterior environment outside the own vehicle 1 is described in detail with reference to the operation of each of these components of the central controller 154.

[Method of Recognizing Exterior Environment Outside Vehicle]

Figure 3:
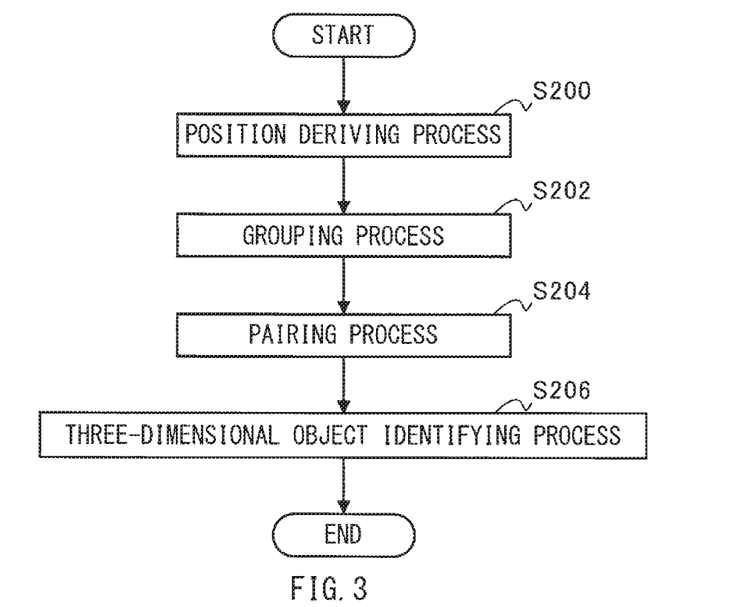
FIG. 3 is a flowchart illustrating an example method of recognizing an exterior environment outside an own vehicle according to one example embodiment of the technology.

FIG. 3 is a flowchart illustrating an example procedure for recognizing an exterior environment outside the own vehicle 1. In the procedure for recognizing the exterior environment outside the own vehicle 1, the position deriving unit 170 performs, in Step S200, a position deriving process for deriving three-dimensional positions of respective blocks from the luminance image received from the imaging unit 110. Thereafter, in Step S202, the grouping unit 172 performs a grouping process for grouping the respective blocks to identify potential three-dimensional objects. In Step S204, the pairing unit 174 performs a pairing process. In the pairing process, the pairing unit 174 projects the potential three-dimensional objects on a horizontal plane, classifies the potential three-dimensional objects into a rear face and a side face on the basis of angles of the potential three-dimensional objects on the horizontal plane with respect to a depth direction, and makes a determination as to whether a relation between the side face and the rear face satisfies a predetermined condition. The pairing unit 174 pairs the side face with the rear face into a single three-dimensional object when the relation between the side face and the rear face satisfies the predetermined condition. In Step S206, the three-dimensional object identifying unit 176 may perform a three-dimensional object identifying process for identifying which specific object the three-dimensional object identified through the pairing or another three-dimensional object correspond to.

[Position Deriving Process in Step S200]

The position deriving unit 170 may receive the respective luminance images from the two imaging units 110, and perform pattern matching between the luminance images. The pattern matching may involve extracting any block from one of the luminance images and searching the other luminance image for a block corresponding to the extracted block. The block may be, for example but not limited to, an array of four horizontal pixels and four vertical pixels. Through the pattern matching, the position deriving unit 170 may derive parallax information indicating a parallax. The parallax information may correspond to a relative distance z described below. The position deriving unit 170 may correlate the derived parallax information with the corresponding block to generate a distance image. Although each of the block may be an array of four horizontal pixels and four vertical pixels in this example embodiment, the number of pixels in each block may be any desired number. In another example embodiment, each of the blocks may include a single pixel. As used herein, the term "horizontal" refers to a lateral direction of a screen of the captured image, the term "vertical" refers to a longitudinal direction of the screen of the captured image, and the term "depth" refers to a depth direction of the screen of the captured image.

Figure 4A:
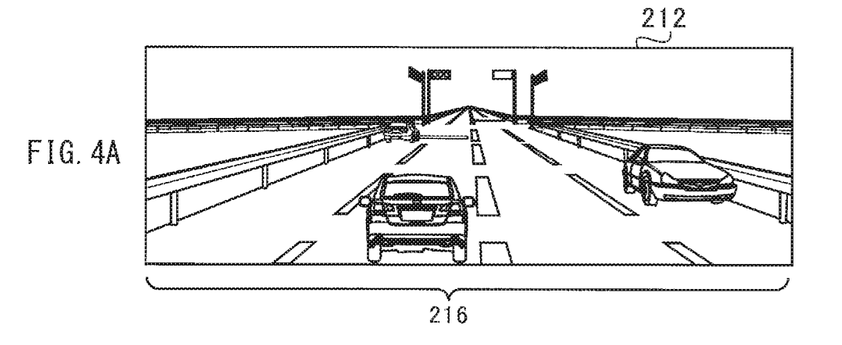
FIG. 4A is a diagram illustrating an example luminance image.
Figure 4B:
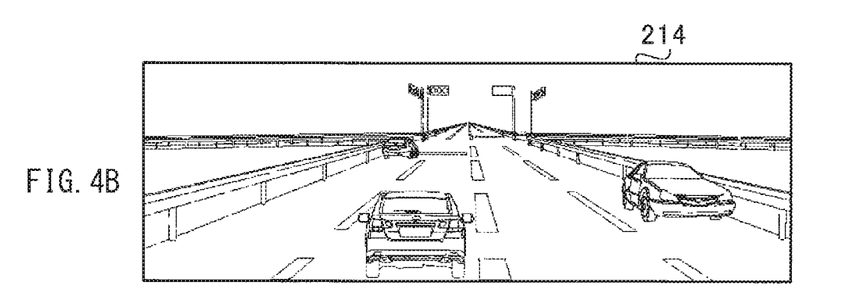
FIG. 4B is a diagram illustrating an example distance image.

FIG. 4A illustrates a luminance image 212, and FIG. 4B illustrates a distance image 214. For example, the two imaging units 110 may generate the respective luminance images 212 of a detection region 216, as illustrated in FIG. 4A. Note that only one of the luminance images 212 generated by the imaging units 110 is schematically illustrated in FIG. 4A for easier understanding of the example embodiment of the technology. In the example embodiment, the position deriving unit 170 may obtain parallax information per block from the luminance image 212 and generate the distance image 214 illustrated in FIG. 4B, for example. Each block in the distance image 214 may be correlated with the corresponding parallax information. For convenience of illustration, the block correlated with the corresponding parallax information is represented as a solid dot, in FIG. 4B.

The position deriving unit 170 may convert the parallax information per block of the distance image 214 into a three-dimensional position in a real space having a horizontal distance x, a height y, and a relative distance z through a so-called stereo method. The stereo method described herein may refer to a method for deriving, from the parallax information correlated with each of the blocks (having one or more pixels) of the distance image 214, the relative distance z from the block to the imaging unit 110 through triangulation. Additionally, the position deriving unit 170 may detect, in the distance image 214, a point that is located on the road surface and apart from the imaging unit 110 by the relative distance z. On the basis of the relative distance z of the block and a distance between the block and the point detected in the distance image 214, the position deriving unit 170 may determine the height y of the block from the road surface. Thereafter, the position deriving unit 170 may correlate the determined three-dimensional position with the distance image 214 again. Since various known techniques may be applied to perform the process for determining the relative distance z and the process for identifying the three-dimensional position, the detailed description of these processes is not given in detail herein.

[Grouping Process in S202]

The grouping unit 172 may group some of the blocks having a difference within a predetermined range in the three-dimensional position. For example, the grouping unit 172 may group some of the blocks that are different from one another in the horizontal distance x, the height y, and the relative distance z by a predetermined value (for example, 0.1 meters) or less on the assumption that these blocks belong to a single specific object. A virtual group of the blocks may be thereby produced. Additionally, the grouping unit 172 may further unify the virtual group of the blocks produced by the grouping process described above and a block that is different, by a predetermined value or less, from the virtual group in the horizontal distance x, the height y, and the relative distance z into one group. As a result, all the blocks that are assumed to belong to a single specific object may be grouped.

Figure 5A:
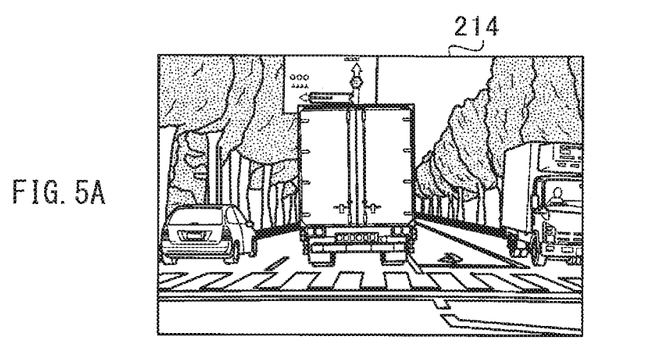
FIG. 5A is a diagram illustrating an example grouping process.
Figure 5B:
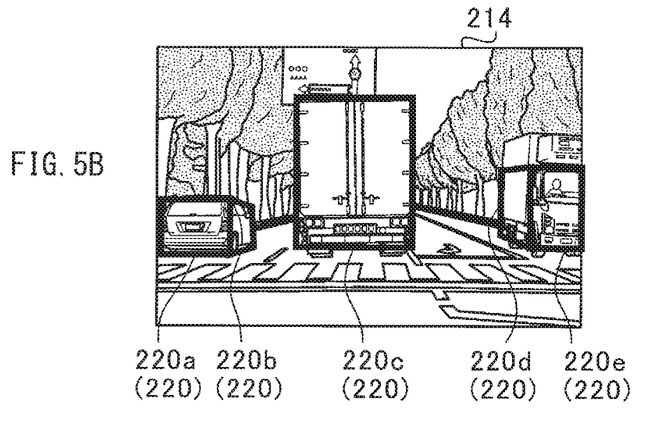
FIG. 5B is a diagram illustrating the example grouping process.
Figure 5C:
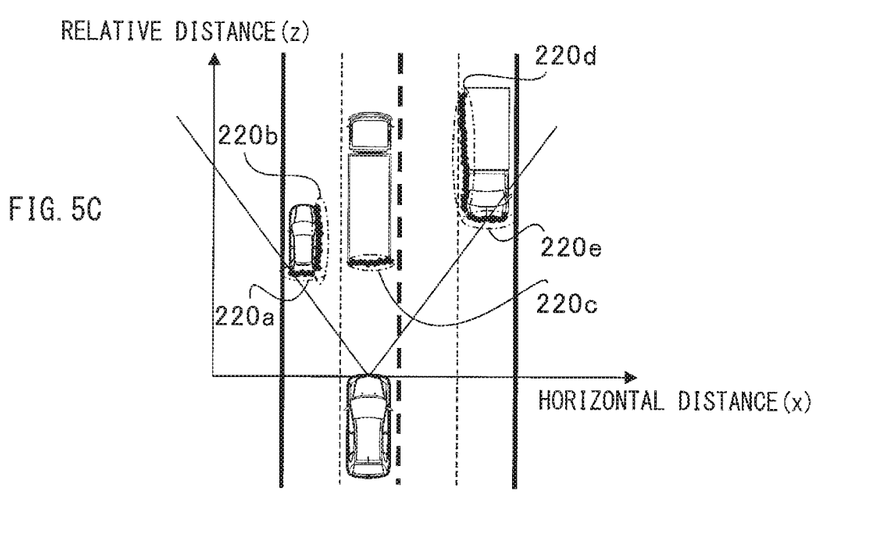
FIG. 5C is a diagram illustrating the example grouping process.

FIGS. 5A to 5C illustrate an example grouping process in Step S202. For example, the grouping unit 172 may group blocks of the distance image 214 illustrated in FIG. 5A to extract a plurality of groups of the blocks as illustrated in FIG. 5B, for example. In FIG. 5B, the groups of the blocks that are each surrounded by an outline, such as rectangular frames each defined by a horizontal line and a vertical line, or rectangular faces each defined by a vertical line and a depth line extending in the depth direction, may correspond to potential three-dimensional objects 220 (i.e., potential three-dimensional objects 220a to 220e).

The groups of the blocks or the potential three-dimensional objects 220a to 220e may be projected on a two-dimensional horizontal plane having the horizontal distance x and the relative distance z (i.e., a plane defined by the horizontal line and the depth line), as illustrated in FIG. 5C. In FIG. 5C, the potential three-dimensional object 220a and the potential three-dimensional object 220b are illustrated as objects separate from each other. Actually, however, the potential three-dimensional object 220a and the potential three-dimensional object 220b respectively belong to a rear face and a side face of a single preceding vehicle, and are thus supposed to be unified and identified as a single three-dimensional object. Likewise, the potential three-dimensional object 220d and the potential three-dimensional object 220e are supposed to be unified and identified as a single three-dimensional object. The pairing unit 174 may, therefore, pair the potential three-dimensional object belonging to the rear face of one three-dimensional object with the potential three-dimensional object belonging to the side face of the one three-dimensional object.

However, a noise due to an error in measuring the relative distance or mismatching in the distance image 214 can cause the blocks belonging to the rear face and the side face to vibrate. Such a vibration can hinder appropriate pairing between the rear face and the side face, resulting in a difficulty in stably identifying the rear face and the side face as a single three-dimensional object. To address such a concern, the pairing unit 174 appropriately pairs the rear face with the side face to improve accuracy in identifying a three-dimensional object as follows. First, the pairing unit 174 may classify the potential three-dimensional objects 220 into the rear face and the side face on the basis of angles of the potential three-dimensional objects 220 on the horizontal plane with respect to the depth direction in the projection image.

[Pairing Process in S204]

An example operation of the pairing unit 174 is described with reference to FIGS. 6 to 10. FIGS. 6 to 10 each illustrate an example projection image of the potential three-dimensional object 220 on the horizontal plane defined by the horizontal distance x and the relative distance z.

The pairing unit 174 may calculate an angle of an approximation straight line of the potential three-dimensional object 220 with respect to the depth direction along the axis of the relative distance z. In a case where the absolute value of the angle calculated by the pairing unit 174 is 45 degrees or greater and less than 135 degrees, the potential three-dimensional object 220 may be classified as a rear face. In a case where the absolute value of the angle calculated by the pairing unit 174 is 0 degrees or greater and less than 45 degrees or 135 degrees or greater and 180 degrees or less, the potential three-dimensional object 220 may be classified as a side face.

Figure 6A:
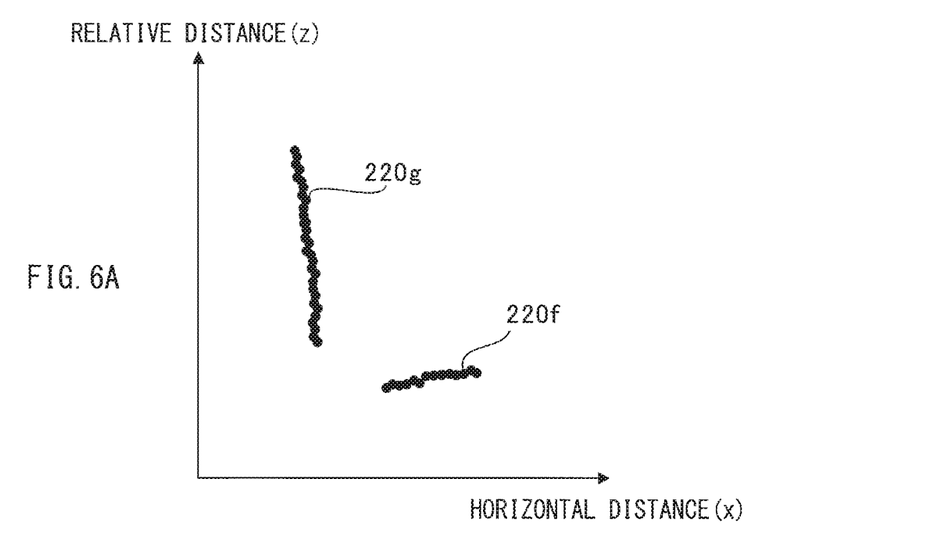
FIG. 6A is a diagram illustrating an example operation of a pairing unit.
Figure 6B:
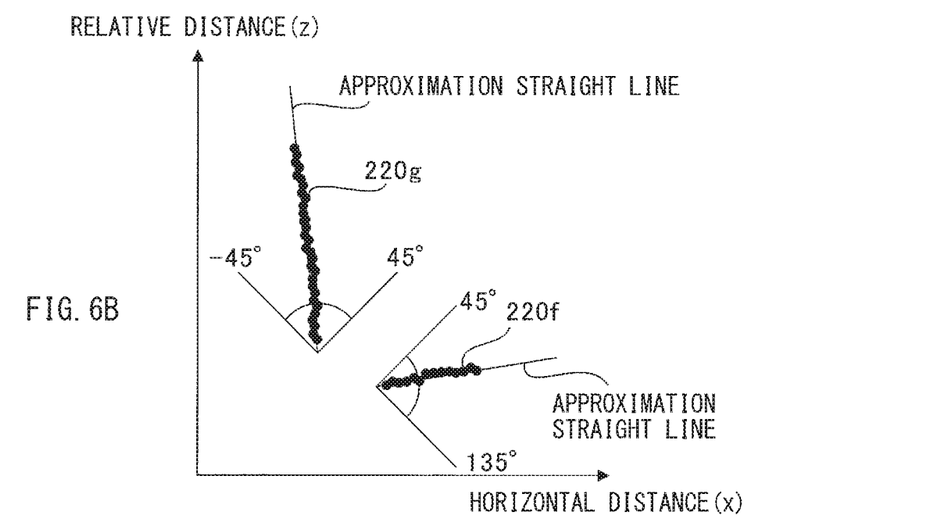
FIG. 6B is a diagram illustrating the example operation of the pairing unit.

FIG. 6A illustrates example potential three-dimensional objects 220g and 220f grouped by the grouping unit 172. In this example, as illustrated in FIG. 6B, the absolute value of the angle of the approximation straight line of the potential three-dimensional object 220f is 45 degrees or greater and less than 135 degrees, and the potential three-dimensional object 220f may thus be classified as a rear face. The absolute value of the angle of the approximation straight line of the potential three-dimensional object 220g is 0 degrees or greater and less than 45 degrees, and the potential three-dimensional object 220g may thus be classified as a side face. The potential three-dimensional objects 220 may be largely classified into the rear face and the side face in this way.

After classifying the potential three-dimensional objects in the detection region 216 into the rear face and the side face as described above, the pairing unit 174 may evaluate possibility of pairing between all of the rear faces and all of the side faces in a round-robin fashion. In other words, the pairing unit 174 may repeat pairing between one of the rear faces and one of the side faces multiple times equal to the total number of the rear faces. The number of repetitions of the pairing may thus be calculated through multiplication of the number of the rear faces by the number of the side faces (i.e., the number of the rear faces×the number of the side faces).

In one example embodiment, the pairing may be performed under conditions that the distance between the rear face and the side face is within an appropriate range (for example, two meters or less) for being identified as a portion of a single vehicle, that the respective speeds of the rear face and the side face are stable, that each of the lengths of the rear face and the side face is a predetermined value (e.g., one meter) or greater, and that a middle position between the rear face and the side face is located in the detection region 216. Setting such conditions for the pairing allows for proper selection or screening of targets to be paired with each other, and thus reduces excess pairing between any one of the rear faces and any one of the side faces that are not supposed to be paired with each other. A combination of any one of the rear faces and any one of the side faces that does not satisfy one or more of the conditions may be immediately excluded from the targets to be paired without being subjected to the pairing process in Step S204. The configuration according to the example embodiment reduces a processing load.

In the following description, as an example, the possibility of pairing between a rear face 222 corresponding to the potential three-dimensional object 220f and a side face 224 corresponding to the potential three-dimensional object 220g may be determined. The pairing unit 174 may evaluate the possibility of the pairing depending on whether a relation between the rear face 222 and the side face 224 satisfies predetermined conditions. When determining that the predetermined conditions are satisfied, the pairing unit 174 may pair the rear face 222 with the side face 224 into a single three-dimensional object. In this example, the predetermined conditions may include four items: a "distance between end points", a "speed vector distance", an "intersection distance", and a "defined angle". The four items are described in detail below. Note that the predetermined conditions do not necessarily include all the four items, and may include one or more of these items as appropriate.

Figure 7:
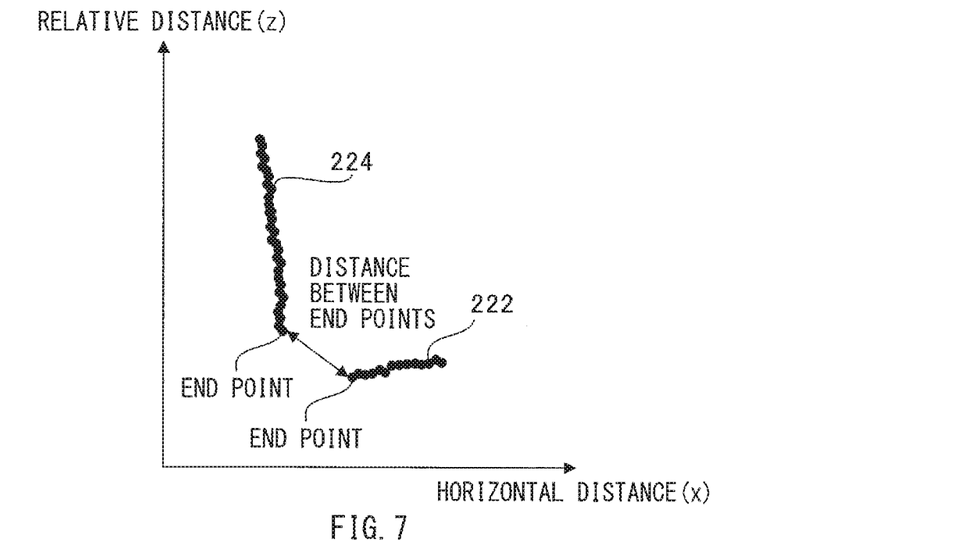
FIG. 7 is a diagram illustrating an example operation of the pairing unit.

The pairing unit 174 may first determine the distance between end points as follows. With reference to FIG. 7, the pairing unit 174 may identify respective end points of the rear face 222 and the side face 224 that are adjacent to each other on the horizontal plane, and may calculate a distance x between the identified end points. Thereafter, the pairing unit 174 calculates a score using the expression $(1-x)/1$, where x denotes the distance x between the end points. Note that the calculation may be performed under a condition that the distance x between the end points is less than 1 meter. For example, when the distance x between the end points is 0 meters, the resultant score is 1.0. When the distance x between the end points is 0.5 meters, the resultant score is 0.5. When the distance x between the end points is 1.0 meter or greater, the resultant score is 0. Accordingly, as the distance x between the end points becomes shorter, that is, as the rear face 222 and the side face 224 come closer to each other, the resultant score becomes greater.

Figure 8A:
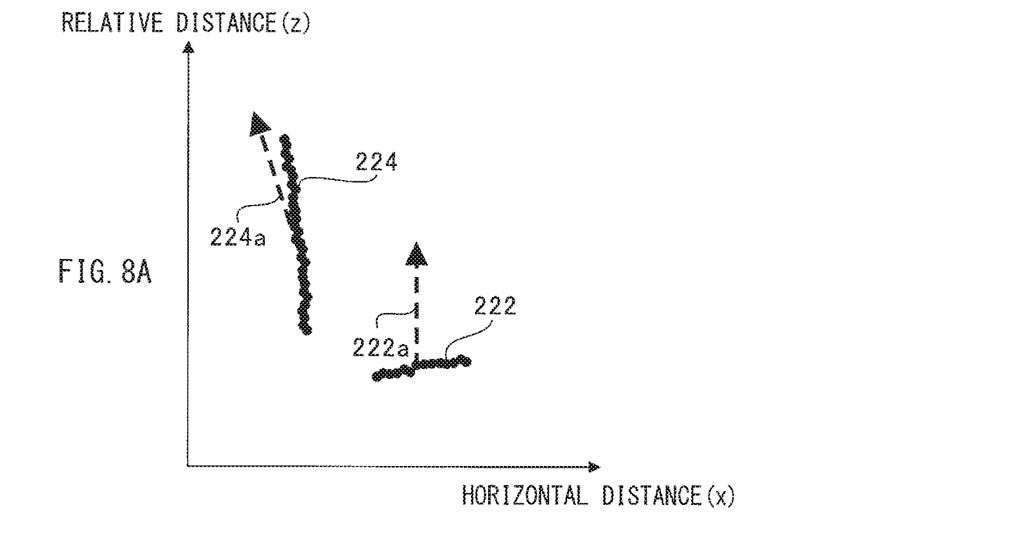
FIG. 8A is a diagram illustrating an example operation of the pairing unit.
Figure 8B:
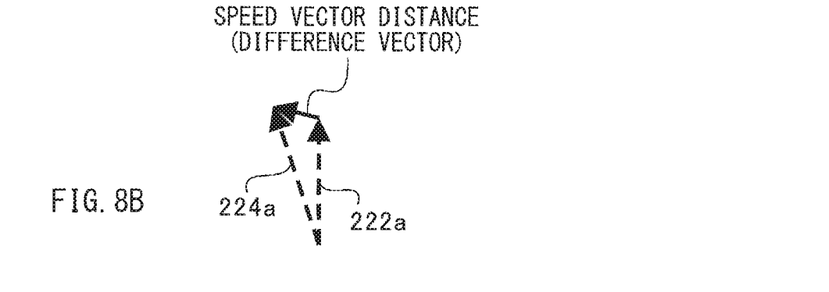
FIG. 8B is a diagram illustrating the example operation of the pairing unit.

Thereafter, the pairing unit 174 may determine the speed vector distance as follows. With reference to FIG. 8A, the pairing unit 174 may calculate respective speed vectors of the rear face 222 and the side face 224 on the horizontal plane. Thereafter, with reference to FIG. 8B, the pairing unit 174 may calculate a difference vector (i.e., a speed vector distance y) between start points of the two speed vectors. The pairing unit 174 may thereafter calculate a score using the expression $(10-y)/10$, where y denotes the speed vector distance y. Note that the calculation may be performed under a condition that the speed vector distance y is less than 10 km/h. When the speed vector distance y is 0 km/h, the resultant score is 1.0. When the speed vector distance y is 5 km/h, the resultant score is 0.5. When the speed vector distance y is 10 km/h or greater, the resultant score is 0. Accordingly, as the speed vector distance y becomes shorter, that is, as the speed vector of the rear face 222 and the speed vector of the side face 224 come closer to each other, the resultant score becomes greater.

Figure 9:
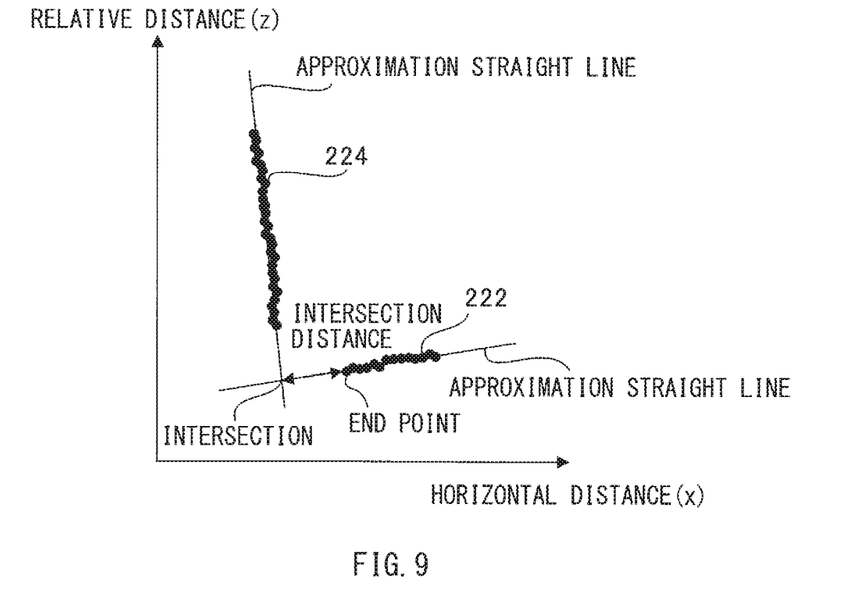
FIG. 9 is a diagram illustrating an example operation of the pairing unit.

Thereafter, the pairing unit 174 may determine the intersection distance as follows. With reference to FIG. 9, the pairing unit 174 may calculate an intersection distance z distance from an intersection between an approximation straight line of the rear face 222 and an approximation straight line of the side face 224 to a proximal end point of the rear face 222a adjacent to the intersection on the horizontal plane. Thereafter, the pairing unit 174 may calculate a score using the expression $(1-z)/1$, where z denotes the intersection distance z. Note that the calculation may be performed under a condition that the intersection distance z is less than 1 meter. When the intersection distance z is 0 meters, the resultant score is 1.0. When the intersection distance z is 0.5 meters, the resultant score is 0.5. When the intersection distance z is 1.0 meter or greater, the resultant score is 0. Accordingly, as the intersection distance z becomes shorter, that is, as the rear face 222 and the side face 224 come closer to each other, the resultant score becomes greater.

Reasons why the proximal end point of the rear face 222 adjacent to the intersection is used rather than a proximal end point of the side face 224 adjacent to the intersection to determine the intersection distance z are described below. One reason is as follows: A relative distance between the rear face 222 and the own vehicle 1 is shorter than a relative distance between the side face 224 and the own vehicle 1. The rear face 222, therefore, has a larger region to be recognized than the side face 224, and thus has a higher resolution than the side face 224. As a result, the rear face 222 is identified with higher accuracy than the side face 224, and accordingly, the end points of the rear face 222 is identified with higher accuracy than the end points of the side face 224. Another reason is as follows: The rear face 222 is more likely to directly contact another vehicle than the side face 224 is. To avoid such a contact, the rear face 222 is identified under more stringent conditions than the side face 224 is. This means that the end points of the rear face 222 satisfy more stringent conditions and have higher reliability than the end points of the side face 224. However, this does not mean to exclude an example embodiment in which the end point of the side face 224 is used to determine the intersection distance z. In another example embodiment, the intersection distance z may be determined from the intersection between the approximation straight line of the rear face 222 and the approximation straight line of the side face 224 to one of the end points of the side face 224. In still another example embodiment, the intersection distance z may be determined by averaging the distance from one of the end points of the rear face 222 to the intersection and the distance from one of the end points of the side face 224 to the intersection.

Figure 10:
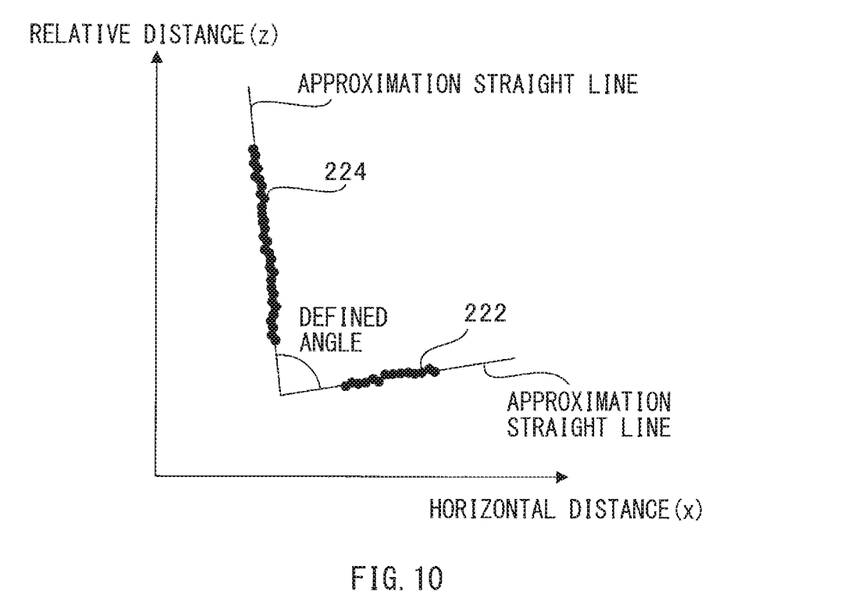
FIG. 10 is a diagram illustrating an example operation of the pairing unit.

Thereafter, the pairing unit 174 may determine the defined angle as follows. With reference to FIG. 10, the pairing unit 174 may calculate a defined angle v between the approximation straight line of the rear face 222 and the approximation straight line of the side face 224 on the horizontal plane. Thereafter, the pairing unit 174 may calculate a score using the expression $(20-|90-v|)/20$, where v denotes the defined angle v. Note that the calculation may be performed under a condition that the define angle v is close to 90 degrees and within a range greater than 70 and 110 degrees or less. When the defined angle v is 90 degrees, the resultant score is 1.0. When the defined angle v is 80 degrees, the resultant score is 0.5. When the defined angle v is 70 degrees or less, the resultant score is 0. Accordingly, as the defined angle v becomes closer to 90 degrees, that is, as the defined angle v between the rear face 222 and the side face 224 becomes closer to 90 degrees, the resultant score becomes greater.

After determining the resultant scores of all of the four items including the distance between end points, the speed vector distance, the intersection distance, and the defined angle, the pairing unit 174 may calculate the sum of the scores. In one example embodiment, a combination of any one of the rear faces and any one of the side faces that produces a resultant score of 0 for one or more of the four items may be excluded from the targets to be paired. The pairing unit 174 may average the sum of the scores of any combination of the rear face 222 and the side face 224 over several frames including a certain frame and several (e.g., five) past frames to determine an average score.

After calculating average scores of all combinations between any one of the extracted rear faces (e.g., the rear face 222) and any one of the side faces including the side face 224, the pairing unit 174 may determine whether each of the average scores exceeds a predetermined threshold (1, for example). The pairing unit 174 may identify, as a target to be paired, a combination of any one of the rear faces and any one of the side faces that produces the highest average score among the average scores exceeding the predetermined threshold, and may perform pairing between the rear face and the side face. The pairing unit 174 may repeat the process multiple times equal to the number of the rear faces.

In the example embodiment described above, the average score among multiple frames may be calculated regardless of the sum of the scores of each frame. Note that the example embodiment is a non-limiting example. In another example embodiment, a combination of any one of the rear faces and any one of the side faces that produces the sum of the scores of 0 for one or more of frames may be excluded from the targets to be paired.

Thereafter, the pairing unit 174 may correct the rear face and the side face that are paired with each other into a three-dimensional object, and may use the corrected data in a subsequent process, such as the collision avoidance control or the cruise control.

Figure 11:
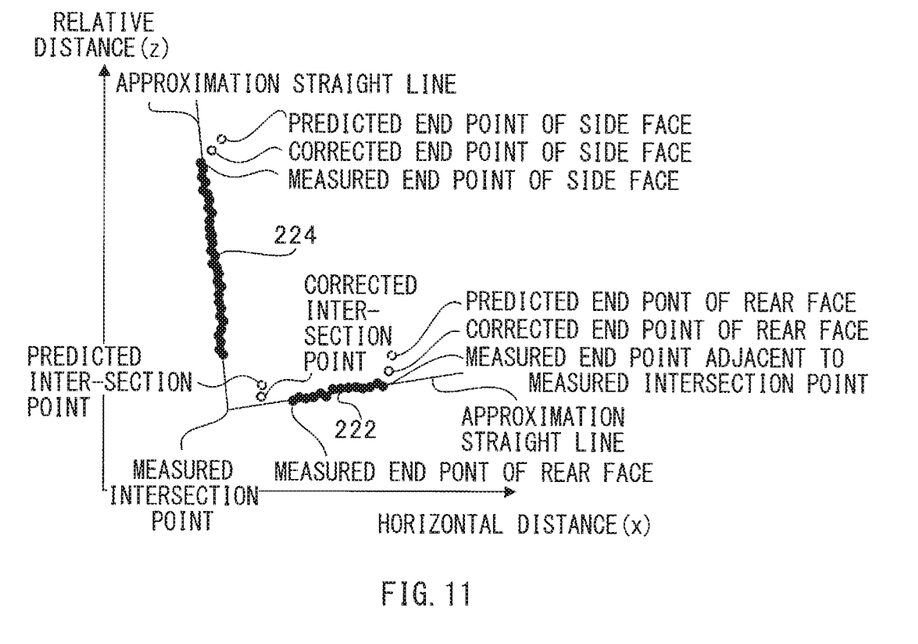
FIG. 11 is a diagram illustrating an example correction of a rear face and a side face.

FIG. 11 illustrates an example correction of the rear face 222 and the side face 224. FIG. 11 illustrates the rear face 222 and the side face 224 that are similar to those illustrated in FIGS. 6 to 10. The pairing unit 174 may first determine measured values of the rear face 222 and the side face 224 that have been paired in a certain frame. For example, as illustrated in FIG. 11, the pairing unit 174 may determine a measured intersection point, a measured end point adjacent to the measured intersection point, a measured end point of the rear face, and a measured end point of the side face. The measured intersection point may be a measured value at an intersection point between the approximation straight line of the rear face 222 and the approximation straight line of the side face 224. The measured end point adjacent to the measured intersection point may be a measured value at a proximal end point of the rear face 222 adjacent to the intersection point. The measured end point of the rear face may be a measured value at a distal end point of the rear face 222 opposite to the proximal end point of the rear face 222. The measured end point of the side face may be a measured value at a distal end point of the side face 224 opposite to a proximal end point of the side face 224 adjacent to the intersection point. In this example embodiment, an intermediate point (i.e., an average value) between the measured intersection point and the proximal end point of the rear face 222 adjacent to the intersection point may be used rather than the actual intersection point between the rear face 222 and the side face 224. One reason for this is that the rear face 222 is identified with higher accuracy than the side face is, and the end point of the rear face 222 thus has higher reliability than that of the side face 224, as described above. Accordingly, the intermediate point between the measured intersection point and the measured end point adjacent to the measured intersection point may be used as a measured value at the intersection point in this example embodiment.

Thereafter, the pairing unit 174 may calculate predicted values for the certain frame from the previously-measured values. The predicted values for the certain frame may include a predicted intersection point, a predicted end point of the rear face, and a predicted end point of the side face that respectively correspond to the intermediate point between the measured intersection point and the measured end point adjacent to the measured intersection point, the measured end point of the rear face, and the measured end point of the side face. For example, the predicted intersection point may be a predicted value at an intermediate point between the measured intersection point and the measured end point adjacent to the measured intersection point. The predicted end point of the rear face may be a predicted value at the measured end point of the rear face. The predicted end point of the side face may be a predicted value at the measured end point of the side face.

Thereafter, the pairing unit 174 may correct the measured values to calculate corrected values including a corrected intersection point, a corrected end point of the rear face, and a corrected end point of the side face. For example, the corrected intersection point may be located at an intermediate position between the predicted intersection point and an intermediate point between the measured intersection point the measured end point adjacent to the measured intersection point. The corrected end point of the rear face may be an intermediate point between the predicted end point of the rear face and the measured end point of the rear face. The corrected end point of the side face may be an intermediate point between the predicted end point of the side face and the measured end point of the side face. The corrected intersection point, the corrected end point of the rear face, and the corrected end point of the side face may be positioned as illustrated in FIG. 11, for example. The corrected intersection point, the corrected end point of the rear face, and the corrected end point of the side face may be used for the contact avoidance control or the cruise control.

In this example embodiment, each of the intermediate points may be determined on the basis of an average horizontal distance between the corresponding measured value and the corresponding predicted value and an average relative distance between the corresponding measured value and the corresponding predicted value. Note that the intermediate points are not necessarily determined on the basis of these average values. In another example embodiment, each of the intermediate points may be weighted depending on its reliability. For example, in a case where the end points of the rear face 222 have high reliability, any one of the intersection points that is closer to the proximal end point of the rear face 222 adjacent to the measured intersection point than to the measured intersection point may be determined to be the corrected intersection point.

Additionally, the pairing unit 174 may calculate, through a method such as Kalman filtering, predicted values for a next frame on the basis of the corrected intersection points, the corrected end points of the rear face, and the corrected end points of the side face of the certain frame and several past frames. The predicted values for the next frame may include a predicted intersection point, a predicted end point of the rear face, and a predicted end point of the side face. The pairing unit 174 may also predict a position of a corrected intersection point for the next frame on the basis of the relative speeds of the rear face and the side face, for example.

[Three-Dimensional Object Identifying Process in S206]

The three-dimensional object identifying unit 176 may identify a specific object to which the three-dimensional object identified through the pairing at the pairing unit 174 and another three-dimensional object correspond. For example, when detecting a three-dimensional object having a size, a shape, and a relative speed that are likely to be identified as a vehicle, and a light source, such as a brake light or a high-mount stop light, located at a predetermined position on a rear portion of the three-dimensional object, the three-dimensional object identifying unit 176 may identify the three-dimensional object as a preceding vehicle.

As described above, it is possible for any of the example embodiments of the technology to appropriately pair a rear face with a side face, correct the rear face and the side face that are paired with each other, and thus improve accuracy in identifying a three-dimensional object.

According to an example embodiment of the technology, a program also may be provided that causes a computer to serve as the vehicle exterior environment recognition apparatus 120, and a computer-readable recording medium that stores the program. Non-limiting examples of the recording medium may include a flexible disk, a magneto-optical disk, ROM, CD, DVD (Registered Trademark), and BD (Registered Trademark). As used herein, the term "program" may refer to a data processor that is written in any language and any description method.

The central controller 154 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the central controller 154. Such a medium may take many forms, including, but not limited to, any type of magnetic medium such as a hard disk, any type of optical medium such as a CD and a DVD, any type of semiconductor memory (i.e., semiconductor circuit)

such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the central controller 154 illustrated in FIG. 2.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

A part or all of the processes in the vehicle exterior environment recognition procedure as disclosed herein does not necessarily have to be processed on a time-series basis in the order described in the example flowchart. A part or all of the processes in the vehicle exterior environment recognition procedure may involve parallel processing or processing based on subroutine.

The invention claimed is:

1. A vehicle exterior environment recognition apparatus comprising:
   a position deriving unit configured to derive three-dimensional positions of respective blocks from an image received from an imaging unit;
   a grouping unit configured to group the respective blocks and identify potential three-dimensional objects from the grouped blocks; and
   a pairing unit configured to
   project the potential three-dimensional objects on a horizontal plane, classify the potential three-dimensional objects into a rear face and a side face on a basis of angles of the potential three-dimensional objects on the horizontal plane with respect to a depth direction, and make a determination as to whether a relation between the side face and the rear face satisfies a predetermined condition, and
   pair the side face with the rear face into a single three-dimensional object when the determination is made that the relation between the side face and the rear face satisfies the predetermined condition.

2. The vehicle exterior environment recognition apparatus according to claim 1, wherein the pairing unit makes the determination in which the predetermined condition is more easily satisfied when a distance between an end point of the rear face and an end point of the side face is shorter on the horizontal plane than when the distance between the end point of the rear face and the end point of the side face is longer on the horizontal plane.

3. The vehicle exterior environment recognition apparatus according to claim 2, wherein the pairing unit makes the determination in which the predetermined condition is more easily satisfied when a difference vector between a speed vector of the rear face and a speed vector of the side face is shorter on the horizontal plane than when the difference vector between the speed vector of the rear face and the speed vector of the side face is longer on the horizontal plane.

4. The vehicle exterior environment recognition apparatus according to claim 3, wherein the pairing unit makes the determination in which the predetermined condition is more easily satisfied when a distance from an intersection point between an approximation straight line of the rear face and an approximation straight line of the side face to a proximal end point of the rear face adjacent to the intersection point is shorter on the horizontal plane than when the distance from the intersection point between the approximation straight line of the rear face and the approximation straight line of the side face to the proximal end point of the rear face adjacent to the intersection point is longer on the horizontal plane.

5. The vehicle exterior environment recognition apparatus according to claim 3, wherein the pairing unit makes the determination in which the predetermined condition is more easily satisfied when an angle defined between the approximation straight line of the rear face and the approximation straight line of the side face is closer to 90 degrees than when the angle defined between the approximation straight line of the rear face and the approximation straight line of the side face is farther from 90 degrees.

6. The vehicle exterior environment recognition apparatus according to claim 3, wherein the pairing unit corrects, to an intermediate point between a measured value and a predicted value, one or more of the intersection point between the approximation straight line of the rear face and the approximation straight line of the side face, a distal end point of the rear face, and a distal end point of the side face, the distal end point of the rear face being opposite to the proximal end point of the rear face adjacent to the intersection point, the distal end point of the side face being opposite to a proximal end point of the side face adjacent to the intersection point.

7. The vehicle exterior environment recognition apparatus according to claim 2, wherein the pairing unit makes the determination in which the predetermined condition is more easily satisfied when a distance from an intersection point between an approximation straight line of the rear face and an approximation straight line of the side face to a proximal end point of the rear face adjacent to the intersection point is shorter on the horizontal plane than when the distance from the intersection point between the approximation straight line of the rear face and the approximation straight line of the side face to the proximal end point of the rear face adjacent to the intersection point is longer on the horizontal plane.

8. The vehicle exterior environment recognition apparatus according to claim 2, wherein the pairing unit makes the determination in which the predetermined condition is more easily satisfied when an angle defined between the approximation straight line of the rear face and the approximation straight line of the side face is closer to 90 degrees than when the angle defined between the approximation straight line of the rear face and the approximation straight line of the side face is farther from 90 degrees.

9. The vehicle exterior environment recognition apparatus according to claim 2, wherein the pairing unit corrects, to an intermediate point between a measured value and a predicted value, one or more of the intersection point between the approximation straight line of the rear face and the approximation straight line of the side face, a distal end point of the rear face, and a distal end point of the side face, the distal end point of the rear face being opposite to the proximal end point of the rear face adjacent to the intersection point, the distal end point of the side face being opposite to a proximal end point of the side face adjacent to the intersection point.

10. The vehicle exterior environment recognition apparatus according to claim 1, wherein the pairing unit makes the determination in which the predetermined condition is more easily satisfied when a difference vector between a speed vector of the rear face and a speed vector of the side face is shorter on the horizontal plane than when the difference vector between the speed vector of the rear face and the speed vector of the side face is longer on the horizontal plane.

11. The vehicle exterior environment recognition apparatus according to claim 10, wherein the pairing unit makes the determination in which the predetermined condition is more easily satisfied when a distance from an intersection point between an approximation straight line of the rear face and an approximation straight line of the side face to a proximal end point of the rear face adjacent to the intersection point is shorter on the horizontal plane than when the distance from the intersection point between the approximation straight line of the rear face and the approximation straight line of the side face to the proximal end point of the rear face adjacent to the intersection point is longer on the horizontal plane.

12. The vehicle exterior environment recognition apparatus according to claim 10, wherein the pairing unit makes the determination in which the predetermined condition is more easily satisfied when an angle defined between the approximation straight line of the rear face and the approximation straight line of the side face is closer to 90 degrees than when the angle defined between the approximation straight line of the rear face and the approximation straight line of the side face is farther from 90 degrees.

13. The vehicle exterior environment recognition apparatus according to claim 10, wherein the pairing unit corrects, to an intermediate point between a measured value and a predicted value, one or more of the intersection point between the approximation straight line of the rear face and the approximation straight line of the side face, a distal end point of the rear face, and a distal end point of the side face, the distal end point of the rear face being opposite to the proximal end point of the rear face adjacent to the intersection point, the distal end point of the side face being opposite to a proximal end point of the side face adjacent to the intersection point.

14. The vehicle exterior environment recognition apparatus according to claim 1, wherein the pairing unit makes the determination in which the predetermined condition is more easily satisfied when a distance from an intersection point between an approximation straight line of the rear face and an approximation straight line of the side face to a proximal end point of the rear face adjacent to the intersection point is shorter on the horizontal plane than when the distance from the intersection point between the approximation straight line of the rear face and the approximation straight line of the side face to the proximal end point of the rear face adjacent to the intersection point is longer on the horizontal plane.

15. The vehicle exterior environment recognition apparatus according to claim 1, wherein the pairing unit makes the determination in which the predetermined condition is more easily satisfied when an angle defined between the approximation straight line of the rear face and the approximation straight line of the side face is closer to 90 degrees than when the angle defined between the approximation straight line of the rear face and the approximation straight line of the side face is farther from 90 degrees.

16. The vehicle exterior environment recognition apparatus according to claim 1, wherein the pairing unit corrects, to an intermediate point between a measured value and a predicted value, one or more of the intersection point between the approximation straight line of the rear face and the approximation straight line of the side face, a distal end point of the rear face, and a distal end point of the side face, the distal end point of the rear face being opposite to the proximal end point of the rear face adjacent to the intersection point, the distal end point of the side face being opposite to a proximal end point of the side face adjacent to the intersection point.

17. A method of recognizing an exterior environment outside a vehicle, the method comprising:
   determining three-dimensional positions of respective blocks of an image received from an imaging unit;
   grouping the respective blocks and identifying potential three-dimensional objects from the grouped blocks;
   projecting the potential three-dimensional objects on a horizontal plane, classifying the potential three-dimensional objects into a rear face and a side face on a basis of angles of the potential three-dimensional objects on the horizontal plane with respect to a depth direction, and determining whether a relation between the side face and the rear face satisfies a predetermined condition; and
   pairing the side face with the rear face into a single three-dimensional object when determining that the relation between the rear face and the side face satisfies the predetermined condition.

18. A vehicle exterior environment recognition apparatus comprising circuitry configured to
   determine three-dimensional positions of respective blocks of an image received from an imaging unit,
   group the respective blocks and identify potential three-dimensional objects from the grouped blocks,
   project the potential three-dimensional objects on a horizontal plane, classify the potential three-dimensional objects into a rear face and a side face on a basis of angles of the potential three-dimensional objects on the horizontal plane with respect to a depth direction, and make a determination as to whether a relation between the side face and the rear face satisfies a predetermined condition, and
   pair the side face with the rear face into a single three-dimensional object when the determination is made that the relation between the side face and the rear face satisfies the predetermined condition.

* * * * *